United States Patent
Baksh et al.

(10) Patent No.: US 7,763,100 B2
(45) Date of Patent: Jul. 27, 2010

(54) VACUUM PRESSURE SWING ADSORPTION PROCESS AND ENHANCED OXYGEN RECOVERY

(75) Inventors: Mohamed Safdar Allie Baksh, Wheatfield, NY (US); Andrew Chester Rosinski, Orchard Park, NY (US)

(73) Assignee: Praxair Technology, Inc., Danbury, CT (US)

( * ) Notice: Subject to any disclaimer, the term of this patent is extended or adjusted under 35 U.S.C. 154(b) by 903 days.

(21) Appl. No.: 11/480,833

(22) Filed: Jul. 6, 2006

(65) Prior Publication Data

US 2008/0006151 A1    Jan. 10, 2008

(51) Int. Cl.
B01D 53/02 (2006.01)

(52) U.S. Cl. ............... 95/97; 95/100; 95/101; 95/102; 95/103; 95/104; 96/130

(58) Field of Classification Search ......... 95/96, 95/97, 100, 103, 104, 101, 102, 130; 96/108, 96/130, 135
See application file for complete search history.

(56) References Cited

U.S. PATENT DOCUMENTS

| | | | |
|---|---|---|---|
| 4,684,377 A | 8/1987 | Haruna et al. | |
| 4,857,083 A | 8/1989 | DiMartino | |
| 4,915,711 A | 4/1990 | Kumar | |
| 5,330,561 A * | 7/1994 | Kumar et al. | 95/101 |
| 5,518,526 A | 5/1996 | Baksh et al. | 95/100 |
| 5,656,067 A | 8/1997 | Watson et al. | |
| 5,656,068 A | 8/1997 | Smolarek et al. | 95/101 |
| 5,997,612 A | 12/1999 | Doong | 95/101 |
| 6,010,555 A | 1/2000 | Smolarek et al. | 95/98 |
| 6,027,548 A | 2/2000 | Ackley et al. | |
| 6,471,748 B1 | 10/2002 | Ackley | |
| 6,500,234 B1 | 12/2002 | Ackley et al. | |
| 6,506,234 B1 | 1/2003 | Ackley et al. | |
| 6,743,745 B2 | 6/2004 | Jaussaud et al. | |
| 6,780,806 B1 | 8/2004 | Yang et al. | |
| 6,790,260 B2 | 9/2004 | Ackley et al. | |
| 2007/0095208 A1 | 5/2007 | Baksh et al. | |
| 2007/0227352 A1 | 10/2007 | Kumar | |
| 2007/0227353 A1 | 10/2007 | Kumar | |
| 2007/0232706 A1 | 10/2007 | Shah et al. | |

* cited by examiner

*Primary Examiner*—Robert A Hopkins
(74) *Attorney, Agent, or Firm*—Salvatore P. Pace

(57) ABSTRACT

Novel polybed VPSA process and system to achieve enhanced $O_2$ recovery are disclosed. The VPSA process comprises using three or more adsorber beds; providing a continuous feed supply gas using a single feed blower to one bed, wherein at any instant during the process, two beds are in an evacuation step and only one bed is in a feed mode; and purging the adsorber beds using two purge gases of different purity. The VPSA cycle may further comprise utilizing a storage device (e.g., a packed or empty equalization tank) to capture void gases during co-current depressurization step of the VPSA cycle, which is used at a later stage for purging and repressurization of the bed. In addition, the VPSA process employs a single feed compressor and two vacuum pumps at 100% utilization. Furthermore, the use of the storage device minimizes the use of product quality gas for purging. About 10-20% improvement in $O_2$ productivity is realized in the new VPSA process.

31 Claims, 6 Drawing Sheets

RPP  Receive Product Pressurization
PM   Product Make
PP   Provide Purge
ETD  Equalization Tank Down
RP   Receive Purge
ETU  Equalization Tank Up
FD   Feed
BD   Blowdown
EV   Evacuation
P    Pump PM   Product Make
PP   Provide Purge
ETD  Equalization Tank Down
RP   Receive Purge
ETU  Equalization Tank Up
FD   Feed
BD   Blowdown
EV   Evacuation
P    Pump

- RPP  Receive Product Pressurization
- PM   Product Make
- PP   Provide Purge
- ETD  Equalization Tank Down
- RP   Receive Purge
- ETP  Equalization Tank Purge
- ETU  Equalization Tank Up
- FD   Feed
- BD   Blowdown
- EV   Evacuation
- P    Pump

| RPP | Receive Product Pressurization |
| PM | Product Make |
| PP | Provide Purge |
| EQD | Equalization Down |
| ETD | Equalization Tank Down |
| RP | Receive Purge |
| EQU | Equalization Up |
| ETU | Equalization Tank Up |
| FD | Feed |
| BD | Blowdown |
| EV | Evacuation |
| P | Pump |

PM Product Make
PP Provide Purge
EQD Equalization Down
RP Receive Purge
EQU Equalization Up
FD Feed
BD Blowdown
EV Evacuation
P Pump
AP Air Pressurization

VACUUM PRESSURE SWING ADSORPTION PROCESS AND ENHANCED OXYGEN RECOVERY

TECHNICAL FIELD

The invention relates to a vacuum pressure swing adsorption process and system for the production of oxygen. More particularly, it relates to a process and system adapted for the large scale production of oxygen from air.

BACKGROUND

Presently, two and three bed pressure swing adsorption (PSA) or vacuum pressure swing adsorption (VPSA) processes are commonly used for production of oxygen. As the plant capacity increases, the total waste gas increases due to modest $O_2$ recovery, and the vacuum pump(s) requires more time to remove the total waste during bed regeneration as pumps are operating closer to maximum throughputs. In such situations greater than 60% $O_2$ recovery can be achieved using four or more beds to run the PSA process with additional steps to allow more time for bed regeneration and the recovery of void gases in the bed prior to counter-current blowdown. Compared to two and three bed processes, the four or more bed processes offer more degrees of freedom (process operating conditions, bed size and cycles) and lower unit costs.

Two-bed VPSA processes for the production of oxygen from air are disclosed by Baksh et al. (U.S. Pat. No. 5,518,526) and Smolarek et al. (U.S. Pat. No. 6,010,555). Both of these patents disclosed two-bed VPSA processes for producing $O_2$ from air.

Smolarek et al. (U.S. Pat. No. 5,656,068) disclosed a four-bed VPSA process, operated as two pairs of 2-bed systems, referred to as 2×2 cycle/system, to produce oxygen from air. Each pair of beds is operated 180° out of phase and the two pairs of beds are operated out of phase by one-half of a half-cycle. Two compressors (one Roots or positive displacement and one centrifugal) and two vacuum pumps (one Roots or positive displacement and one centrifugal) are utilized in the VPSA process of U.S. Pat. No. 5,656,068. One of the two compressors is periodically in the idle or vent mode.

Doong (U.S. Pat. No. 5,997,612) disclosed a four-bed VPSA system operating as two pairs of adsorption beds to produce about 100 tons per day (TPD) oxygen. The VPSA process includes two pairs of beds, an intermediate storage tank (to collect co-current depressurization for use in purging of the beds), one gas blower and a pair of vacuum pumps. The system disclosed in U.S. Pat. No. 5,997,612 utilizes three pumps versus the four pumps used in U.S. Pat. No. 5,656,068. Furthermore, the system disclosed in U.S. Pat. No. 5,997,612 handles a single feed stream versus a dual feed stream as disclosed in U.S. Pat. No. 5,656,068.

More recently, a four-bed VPSA system and process with a dual feed inlet for large scale oxygen production (e.g., >350 tons/day $O_2$) has been disclosed in U.S. patent application Ser. No. 11/264,278. The system disclosed uses two compressors and one vacuum pump rather than the two compressors and two vacuum pumps disclosed in U.S. Pat. No. 5,656,068.

In the application of VPSA or PSA processes, the energy input required to achieve the separation of $O_2$ from the feed mixture (e.g., air) is provided as mechanical work through feed compressor(s) and vacuum pump(s). The cost of this work is a significant component of the total operating cost of the VPSA process. Also, VPSA or PSA is currently economically competitive with cryogenic distillation for small scale applications only. In order for PSA or VPSA processes to become cost competitive with cryogenic distillation for large scale applications, four or more beds are required to operate improved PSA cycles to achieve enhanced PSA process performance and to lower operating cost.

Therefore, it would be desirable to provide an improved multiple bed system that could provide enhanced performance and lower operating cost for large scale oxygen production.

SUMMARY OF THE INVENTION

The present invention generally relates to a polybed vacuum pressure swing adsorption (VPSA) process and system to achieve enhanced $O_2$ recovery. The process comprises (a) using a system comprising three or more adsorber beds, (b) continuously feeding a feed supply gas into a feed input end of one adsorber bed, said bed containing at least one adsorbent which preferentially adsorbs the more strongly adsorbable component and withdrawing the at least one less strongly adsorbable product gas component from an exit end of the adsorber bed, (c) providing continuous feeding of the feed supply gas using a single feed blower, (d) purging the adsorber beds using two purge gases of different purity, and (e) producing the product gas component in cycles by steps wherein at any instant during the process, two beds are in an evacuation step and only one bed is in a feed mode.

The VPSA process of the invention uses three pumps (one compressor and two vacuum pumps) with 100% utilization of all the pumps. One embodiment of the present invention also contemplates the use of unique four-bed VPSA cycles that include 100% utilization of the compressor and vacuum pumps while at the same time processing a feed gas continuously. The present invention further contemplates the use of an equalization tank (ET), which is a storage tank used to collect void gas that is co-currently discharged from the adsorption beds, and the use of that gas for partially pressurizing (counter-currently) the beds in the VPSA process, via bed-to-tank equalization. The present invention also contemplates the use of two purge gases of different purity, hereinafter referred to as "low purity purge gas" and "high purity purge gas", which are used for purging the beds in the VPSA cycle. The high purity purge gas goes directly to another bed undergoing the purging step without the use of any storage tank, and the low purity gas is generated from another bed undergoing a co-current depressurization step following the bed-to-tank equalization step. The steps in the VPSA cycle are arranged in such a manner that low quality purge gas is used for the initial purging of the bed followed by the use of high purity purge gas for the final purging of the bed. Moreover, at any instant in the VPSA cycle, two of the beds are simultaneously in the evacuation step, and only one bed is in the feed mode. Also, each of the beds in the evacuation step is connected to a vacuum pump, resulting in the need for two vacuum pumps in the VPSA process. The present invention also contemplates a separate counter-current blowdown step so that the waste generated during this step bypasses the vacuum pump. The present invention further contemplates intermediate pressurization steps (e.g., a bed-to-tank equalization step and an overlap feed and product pressurization step) to minimize blow-by of feed gas during the feed pressurization step.

The VPSA system of the present invention comprises three or more adsorption beds in a single train; an equalization tank (ET) to collect void gas that is co-currently discharged from the adsorption beds; at least one vacuum pump to evacuate two adsorption beds simultaneously; and a feed compressor.

BRIEF DESCRIPTION OF DRAWINGS

For a more complete understanding of the present invention and the advantages thereof, reference should be made to the following Detailed Description taken in conjunction with the accompanying drawings in which.

DETAILED DESCRIPTION OF THE INVENTION

Figure 1:
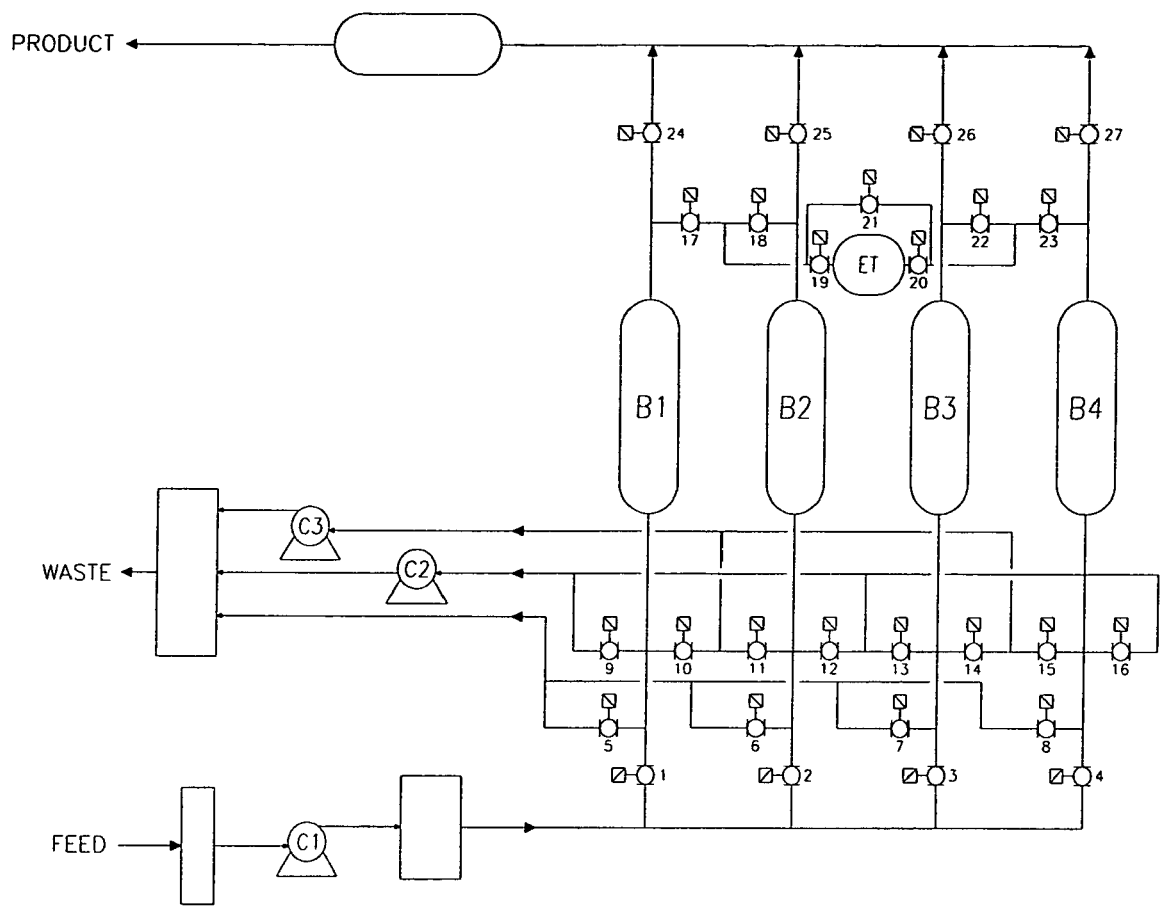
FIG. 1 is a schematic of the four-bed VPSA process using one equalization tank (ET) and three pumps (one feed compressor and two vacuum pumps).

The present invention is directed to the application of polybed VPSA processes to achieve enhanced oxygen recovery and higher throughput over prior art VPSA $O_2$ processes. The process comprises (a) using a system comprising three or more adsorber beds, (b) continuously feeding a feed supply gas into a feed input end of one adsorber bed, said bed containing at least one adsorbent which preferentially adsorbs the more strongly adsorbable component and withdrawing the at least one less strongly adsorbable product gas component from an exit end of the adsorber bed, (c) providing continuous feeding of the feed supply gas using a single feed blower, (d) purging the adsorber beds using two purge gases of different purity, and (e) producing the product gas component in cycles by steps wherein at any instant during the process, two beds are in an evacuation step and only one bed is in a feed mode. The term "polybed" means having three or more adsorber beds.

At any instant in the VPSA cycle of the present invention, two beds are undergoing the evacuation step. Also, one embodiment of this invention introduces a four-bed VPSA cycle comprising 100% utilization of one compressor and two vacuum pumps while at the same time processing a feed gas continuously. Furthermore, at least one-half of the total VPSA cycle time is dedicated to the counter-current evacuation and purging of the beds. Some of the key features include, but are not limited to: (1) continuous feed to the VPSA process; (2) only three machines (one compressor and two vacuum pumps) are required; (3) 100% utilization of one compressor and two vacuum pumps; (4) use of an equalization tank (ET) to collect co-current depressurization gas to be used at a later stage for re-pressurization of the bed via a bed-to-tank equalization step; (5) the option of using same or different vacuum pumps (e.g., centrifugal, Roots or positive displacement) for evacuating the feed end of the beds during counter-current evacuation and purging steps of the VPSA process; (6) the use of two different purity purge gases, hereinafter, refer to as low and high purity purge gas, for purging the beds in the VPSA cycle. The high purity purge gas goes directly to another bed undergoing the purging step without the use of any storage tank, and the low purity gas comes from a co-current depressurization step following the bed-to-tank equalization step. This low purity gas also goes directly to another bed that has just completed the last counter-current evacuation step in the VPSA cycle. The steps in the VPSA cycle are arranged in such a manner that low quality purge gas is used for the initial purging of the beds followed by the use of high purity purge gas for the final purging of the beds. Such mode of operation allows for the use of low purity purge gas for purging another bed while at the same time minimizes the quantity of high purity gas, obtained from another bed in the production mode, to complete the purging step; (7) the use of a separate counter-current blowdown step so that the waste during this step bypasses the vacuum pump; and (8) the VPSA cycle incorporates intermediate pressurization steps (e.g., bed-to-tank equalization step and overlap feed and product pressurization step) to minimize blow-by of feed gas during the feed pressurization step. The term "compressor" and the term "feed pump" are used interchangeably herein.

One embodiment of this invention shows a novel four-bed PSA process that utilizes an ET to achieve enhanced $O_2$ recovery and allows for full VPSA cycle step integration and the avoidance of any idle step(s) in the VPSA cycle. The ET communicates only with the product end of the adsorber bed and never sees the feed gas. The recovered void gas collected in the ET is used at a later step in the cycle for purging and repressurization of the bed. This embodiment is described herein with reference to the four-bed VPSA process shown in FIG. 1, the four-bed VPSA cycle shown in FIG. 2, and the valve switching logic as shown in Table 1.

TABLE 1

Valve Firing Sequence for sixteen step four-bed oxygen VPSA Process

| | | | | | | | | Step | | | | | | | |
|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 |
| | | | | | | | | Bed 1 | | | | | | | |
| FD/PP | AD1 | AD2/PPG | AD3 | ETD | PPG | BD | EV1 | EV2 | EV3 | EV4 | EV5 | EV6 | EV7/PG | EV8/PG | ETU |
| | | | | | | | | Bed 2 | | | | | | | |
| EV6 | EV7/PG | EV8/PG | ETU | FD/PP | AD1 | AD2/PPG | AD3 | ETD | PPG | BD | EV1 | EV2 | EV3 | EV4 | EV5 |
| | | | | | | | | Bed 3 | | | | | | | |

TABLE 1-continued

Valve Firing Sequence for sixteen step four-bed oxygen VPSA Process

| | EV2 | EV3 | EV4 | EV5 | EV6 | EV7/PG | EV8/PG | ETU | FD/PP | AD1 | AD2/PPG | AD3 | ETD | PPG | BD | EV1 |
|---|---|---|---|---|---|---|---|---|---|---|---|---|---|---|---|---|
| | | | | | | | | Bed 4 | | | | | | | | |
| | ETD | PPG | BD | EV1 | EV2 | EV3 | EV4 | EV5 | EV6 | EV7/PG | EV8/PG | ETU | FD/PP | AD1 | AD2/PPG | AD3 |
| Valve No. | | | | | | | | | | | | | | | | |
| 1 | O | O | O | O | C | C | C | C | C | C | C | C | C | C | C | C |
| 2 | C | C | C | C | +O | O | O | O | C | C | C | C | C | C | C | C |
| 3 | C | C | C | C | C | C | C | C | O | O | O | O | C | C | C | C |
| 4 | C | C | C | C | C | C | C | C | C | C | C | C | O | O | O | O |
| 5 | C | C | C | C | C | C | O | C | C | C | C | C | C | C | C | C |
| 6 | C | C | C | C | C | C | C | C | C | C | O | C | C | C | C | C |
| 7 | C | C | C | C | C | C | C | C | C | C | C | C | C | C | O | C |
| 8 | C | C | O | C | C | C | C | C | C | C | C | C | C | C | C | C |
| 9 | C | C | C | C | C | C | C | O | O | O | O | C | C | C | C | C |
| 10 | C | C | C | C | C | C | C | C | C | C | C | O | O | O | O | C |
| 11 | O | O | O | C | C | C | C | C | C | C | C | C | C | C | C | O |
| 12 | C | C | C | C | C | C | C | C | C | C | C | O | O | O | O | C |
| 13 | O | O | O | C | C | C | C | C | C | C | C | C | C | C | C | O |
| 14 | C | C | C | O | O | O | O | C | C | C | C | C | C | C | C | C |
| 15 | C | C | C | C | C | C | C | O | O | O | O | C | C | C | C | C |
| 16 | C | C | C | O | O | O | O | C | C | C | C | C | C | C | C | C |
| 17 | C | C | C | C | O | O | C | C | C | C | C | C | C | O | C | O |
| 18 | C | O | C | O | C | C | C | C | O | O | C | C | C | C | C | C |
| 19 | C | C | C | O | O | C | C | C | O | C | C | C | C | C | C | O |
| 20 | O | C | C | C | C | C | C | O | C | C | C | O | O | C | C | C |
| 21 | C | O | C | C | C | O | C | C | C | O | C | C | C | O | C | C |
| 22 | C | C | C | C | C | O | C | O | C | C | C | C | O | O | C | C |
| 23 | O | O | C | C | C | C | C | C | C | O | C | O | C | C | C | C |
| 24 | O | O | O | O | C | C | C | C | C | C | C | C | C | C | O | C |
| 25 | C | C | O | C | O | O | O | O | C | C | C | C | C | C | C | C |
| 26 | C | C | C | C | C | C | O | C | O | O | O | O | C | C | C | C |
| 27 | C | C | C | C | C | C | C | C | C | C | O | C | O | O | O | O |

Figure 2:
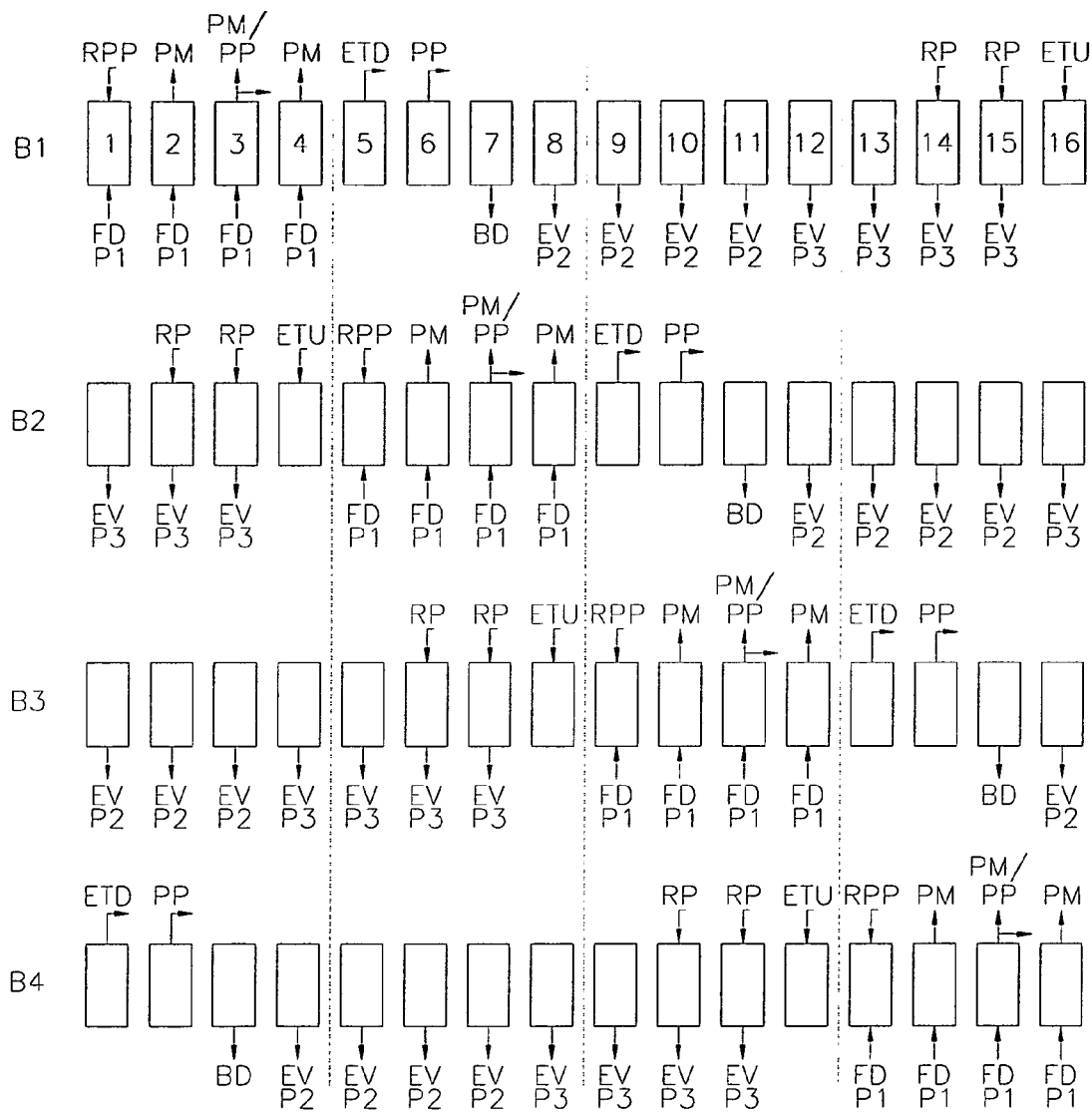
FIG. 2 is a schematic of the sixteen-step four-bed VPSA column cycle for use in the four-bed VPSA process of FIG. 1.

AD: Adsorption/Product Production
BD: Blowdown
ETD: Equalization Down from Tank
ETU: Equalization Up from Tank
EV: Evacuation
FD: Feed Pressurization
PG: Receive Purge
PP: Product Pressurization
PPG: Provide Purge Gas The four-bed VPSA system in FIG. 1 consists of four adsorber beds, one equalization tank (ET), one product tank, 27 ON/OFF valves (which may or may not have flow control), one feed compressor, two vacuum compressors, inlet and discharge silencers and associated piping and fittings. Referring to FIGS. 1 and 2 and Table 1, one embodiment of this invention is disclosed over one complete VPSA cycle. For the purpose of illustrating the invention, the product gas is oxygen.

Step No. 1

At the start of step 1, Bed 1 (B1) pressure is lower than the product tank pressure. Valve 1 opens to allow feed gas into the bottom of Bed 1 from Compressor 1 (C1) and Valve 24 opens to allow product gas into the top of Bed 1. Valve 11 remains open to continue the evacuation of Bed 2 (B2) thru Compressor 3 (C3). Valve 13 remains open to continue the evacuation of Bed 3 (B3) thru Compressor 2 (C2). Valves 23 and 20 open to allow gas to flow from the top of Bed 4 (B4) into the ET for later use.

Step No. 2

At the start of step 2, Valve 1 remains open to continue the flow of feed gas into the bottom of Bed 1. Valve 24 remains open and oxygen production begins when Bed 1 pressure reaches the adsorption pressure. Valve 11 remains open to continue the evacuation of Bed 2 thru compressor 3. Valve 13 remains open to continue the evacuation of Bed 3 thru Compressor 2. Valve 23 remains open while Valve 20 closes and Valves 21 and 18 open to allow gas to flow out of the top of Bed 4 and into the top of Bed 2.

Step No. 3

At the start of step 3, Valve 1 remains open to continue the flow of feed gas into the bottom of Bed 1. Valve 24 remains open and oxygen production continues from Bed 1. Valve 25 opens to allow product purge gas into the top of Bed 2 while Valve 11 remains open to continue the evacuation of Bed 2 thru Compressor 3. Valve 13 remains open to continue the evacuation of Bed 3 thru Compressor 2. Valve 8 opens to allow Bed 4 to blowdown to atmosphere.

Step No. 4

At the start of step 4, Valve 1 remains open to continue the flow of feed gas into the bottom of Bed 1. Valve 24 remains open and oxygen production continues from Bed 1. Valves 18 and 19 open to allow gas to flow out of the ET and into the Top of Bed 2. Valve 11 closes to stop the evacuation of Bed 2. Valve 13 closes while Valve 14 opens to allow the evacuation of Bed 3 thru Compressor 3. Valve 16 opens to start the evacuation of Bed 4 thru Compressor 2.

Step No. 5
At the start of step 5, Valves 17 and 19 open to allow gas to flow from the top of Bed 1 into the ET for later use. Valve 2 opens to allow feed gas into the bottom of Bed 2 from Compressor 1 and Valve 25 opens to allow product gas into the top of Bed 2. Valve 14 remains open to continue the evacuation of Bed 3 thru Compressor 3. Valve 16 remains open to continue the evacuation of Bed 4 thru Compressor 2.

Step No. 6
At the start of step 6, Valve 17 remains open while Valve 19 closes and Valves 21 and 22 open to allow gas to flow out of the top of Bed 1 and into the top of Bed 3. Valve 2 remains open to continue the flow of feed gas into the bottom of Bed 2. Valve 25 remains open and oxygen production begins when Bed 2 pressure reaches the adsorption pressure. Valve 14 remains open to continue the evacuation of Bed 3 thru Compressor 3. Valve 16 remains open to continue the evacuation of Bed 4 thru Compressor 2.

Step No. 7
At the start of step 7, Valve 5 opens to allow Bed 1 to blowdown to atmosphere. Valve 2 remains open to continue the flow of feed gas into the bottom of Bed 2. Valve 25 remains open and oxygen production continues from Bed 2. Valve 26 opens to allow product purge gas into the top of Bed 3 while Valve 14 remains open to continue the evacuation of Bed 3 thru compressor 3. Valve 16 remains open to continue the evacuation of Bed 4 thru Compressor 2.

Step No. 8
At the start of step 8, Valve 9 opens to start the evacuation of Bed 1 thru Compressor 2. Valve 2 remains open to continue the flow of feed gas into the bottom of Bed 2. Valve 25 remains open and oxygen production continues from Bed 2. Valves 20 and 22 open to allow gas to flow out of the ET and into the Top of Bed 3. Valve 14 closes to stop the evacuation of Bed 3. Valve 16 closes while Valve 15 opens to allow the evacuation of Bed 4 thru Compressor 3.

Step No. 9
At the start of step 9, Valve 9 remains open to continue the evacuation of Bed 1 thru Compressor 2. Valves 18 and 19 open to allow gas to flow from the top of Bed 2 into the ET for later use. Valve 3 opens to allow feed gas into the bottom of Bed 3 from Compressor 1 and Valve 26 opens to allow product gas into the top of Bed 3. Valve 15 remains open to continue the evacuation of Bed 4 thru Compressor 3.

Step No. 10
At the start of step 10, Valve 9 remains open to continue the evacuation of Bed 1 thru Compressor 2. Valve 18 remains open while Valve 19 closes and Valves 21 and 23 open to allow gas to flow out of the top of Bed 2 and into the top of Bed 4. Valve 3 remains open to continue the flow of feed gas into the bottom of Bed 3. Valve 26 remains open and oxygen production begins when Bed 3 pressure reaches the adsorption pressure. Valve 15 remains open to continue the evacuation of Bed 4 thru compressor 3.

Step No. 11
At the start of step 11, Valve 9 remains open to continue the evacuation of Bed 1 thru Compressor 2. Valve 6 opens to allow Bed 2 to blowdown to atmosphere. Valve 3 remains open to continue the flow of feed gas into the bottom of Bed 3. Valve 26 remains open and oxygen production continues from Bed 3. Valve 27 opens to allow product purge gas into the top of Bed 4 while Valve 15 remains open to continue the evacuation of Bed 4 thru Compressor 3.

Step No. 12
At the start of step 12, Valve 9 closes while Valve 10 opens to allow the evacuation of Bed 1 thru Compressor 3. Valve 12 opens to start the evacuation of Bed 2 thru Compressor 2. Valve 3 remains open to continue the flow of feed gas into the bottom of Bed 3. Valve 26 remains open and oxygen production continues from Bed 3. Valves 20 and 23 open to allow gas to flow out of the ET and into the Top of Bed 4. Valve 15 closes to stop the evacuation of Bed 4.

Step No. 13
At the start of step 13, Valve 10 remains open to continue the evacuation of Bed 1 thru Compressor 3. Valve 12 remains open to continue the evacuation of Bed 2 thru Compressor 2. Valves 20 and 22 open to allow gas to flow from the top of Bed 3 into the ET for later use. Valve 4 opens to allow feed gas into the bottom of Bed 4 from Compressor 1 and Valve 27 opens to allow product gas into the top of Bed 4.

Step No. 14
At the start of step 14, Valve 10 remains open to continue the evacuation of Bed 1 thru compressor 3. Valve 12 remains open to continue the evacuation of Bed 2 thru Compressor 2. Valve 22 remains open while Valve 20 closes and Valves 21 and 17 open to allow gas to flow out of the top of Bed 3 and into the top of Bed 1. Valve 4 remains open to continue the flow of feed gas into the bottom of Bed 4. Valve 27 remains open and oxygen production begins when Bed 4 pressure reaches the adsorption pressure.

Step No. 15
At the start of step 15, Valve 24 opens to allow product purge gas into the top of Bed 1 while Valve 10 remains open to continue the evacuation of Bed 1 thru Compressor 3. Valve 12 remains open to continue the evacuation of Bed 2 thru Compressor 2. Valve 7 opens to allow Bed 3 to blowdown to atmosphere. Valve 4 remains open to continue the flow of feed gas into the bottom of Bed 4. Valve 27 remains open and oxygen production continues from Bed 4.

Step No. 16
At the start of step 16, Valves 17 and 19 open to allow gas to flow out of the ET and into the Top of Bed 1. Valve 10 closes to stop the evacuation of Bed 1. Valve 12 closes while Valve 11 opens to allow the evacuation of Bed 2 thru Compressor 3. Valve 13 opens to start the evacuation of Bed 3 thru Compressor 2. Valve 4 remains open to continue the flow of feed gas into the bottom of Bed 4. Valve 27 remains open and oxygen production continues from Bed 4.

Both centrifugal and Roots vacuum pumps are used in the preferred mode of operation. In the preferred mode, the Roots vacuum pump is used in steps 8, 9, 10 and 11, while the centrifugal vacuum pump is used in steps 12, 13, 14 and 15 (referring to FIGS. 1 and 2 and Table 1, for Bed 1 steps during the PSA cycle).

Table 2 gives an example of the operating conditions and the VPSA process performance using nitrogen selective adsorbent in the beds. In the tables, the symbols have the following meaning: TPD=ton (2000 lb) per day of oxygen, kPa=1000 Pa=S.I. unit for pressure (1.0 atm.=101.323 kPa, s=time unit in seconds. Also, in the tables, the nitrogen equilibrium selective adsorbent is Li—X. Details of Li—X adsorbents are given in U.S. Pat. Nos. 6,790,260 (Ackley et al.); 6,743,745 (Jaussaud et al.); 6,506,234 (Ackley et al.); 6,500,234 (Ackley et al.); 6,471,748 (Ackley et al.); 6,027,548 (Ackley et al.); and 6,780,806 (Yang et al.)

TABLE 2

Figure 3:
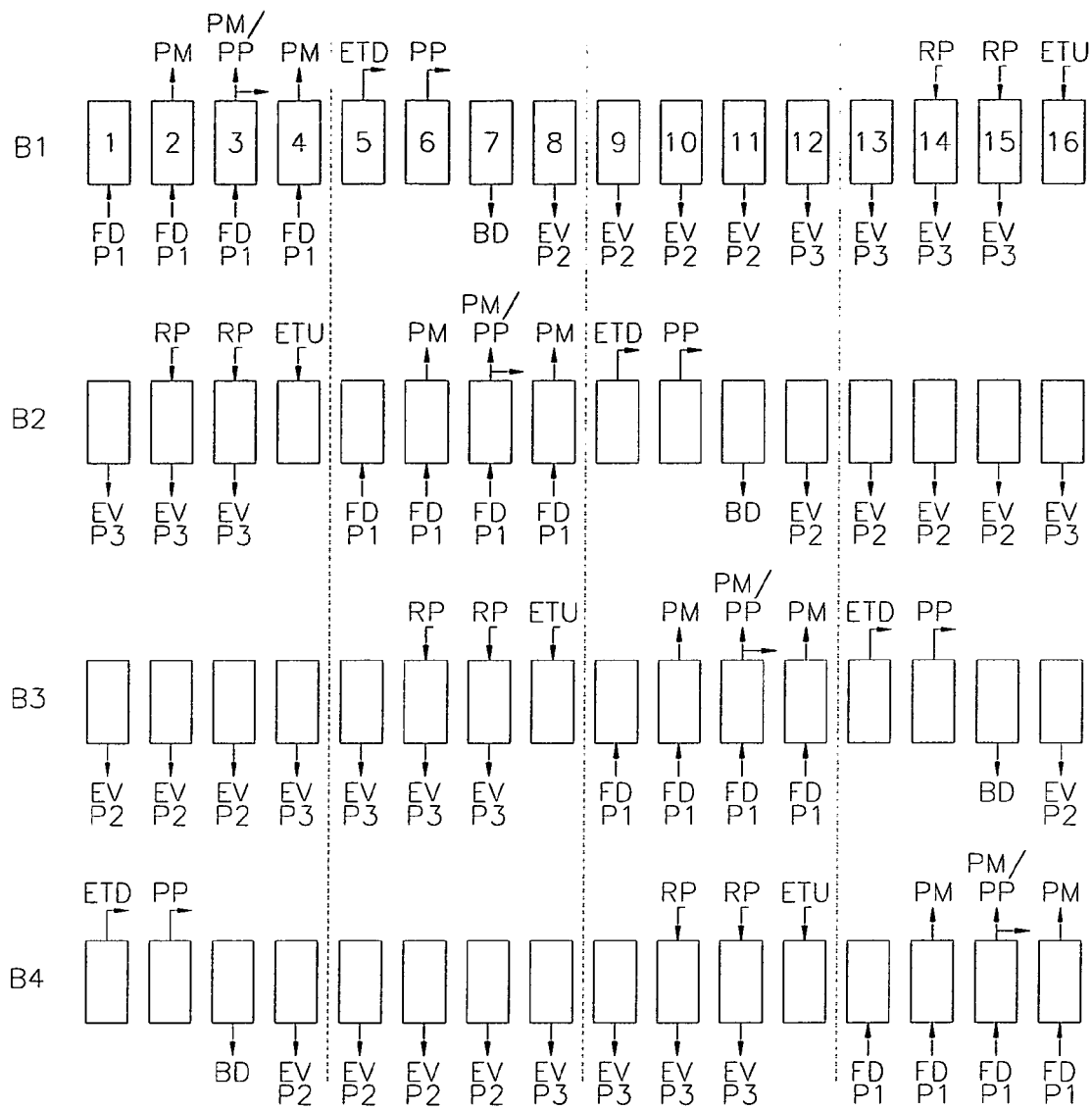
FIG. 3 is a schematic illustrating an alternate four-bed VPSA column cycle for use in the four-bed VPSA process of FIG. 1, wherein there is no product pressurization step from product tank.
Figure 4:
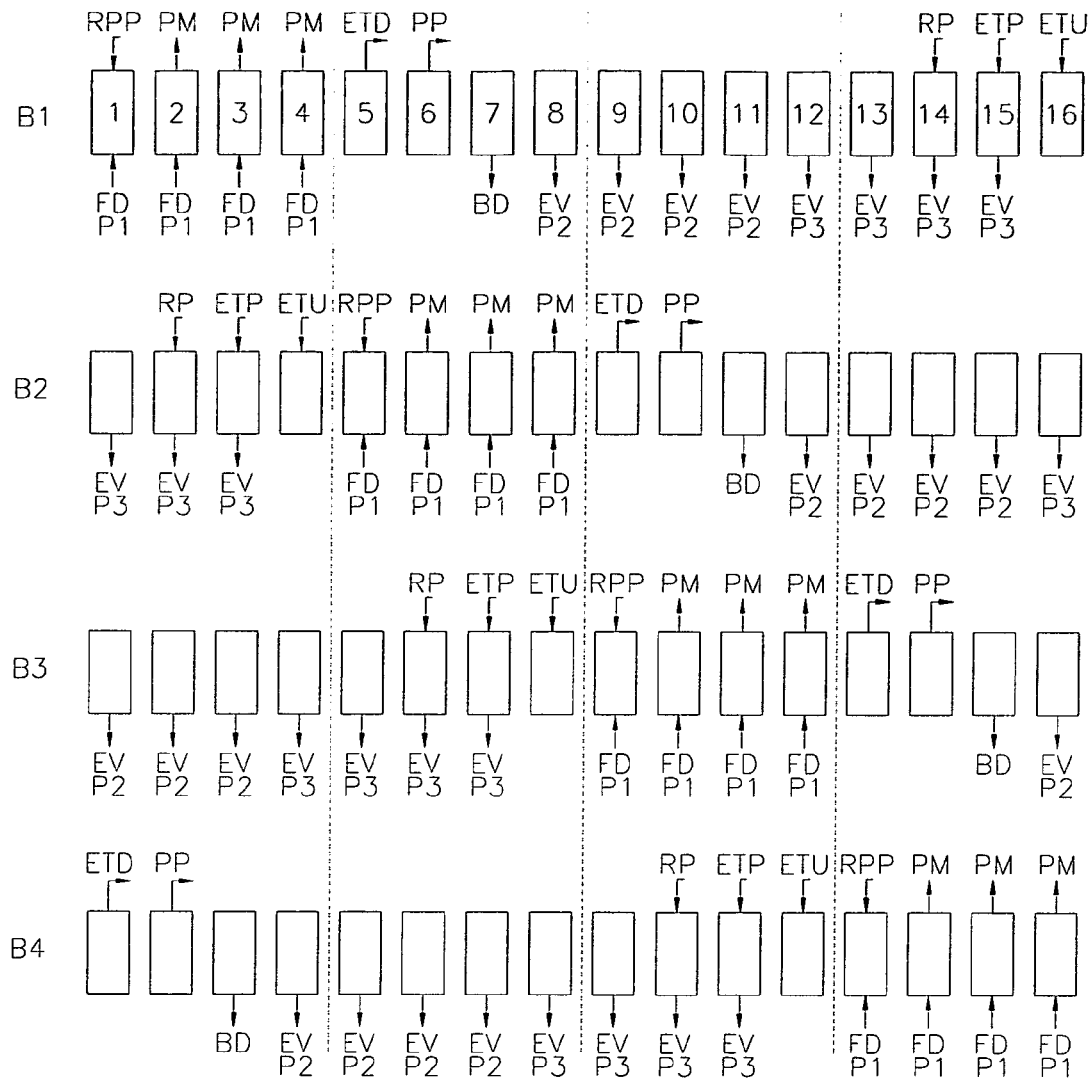
FIG. 4 is a schematic illustrating an alternate four-bed VPSA column cycle for use in the process of FIG. 1, wherein PG gas is obtained from co-current depressurization (CD) steps only and residual gas in ET is used in equalization rising step (EQUP).
Figure 5:
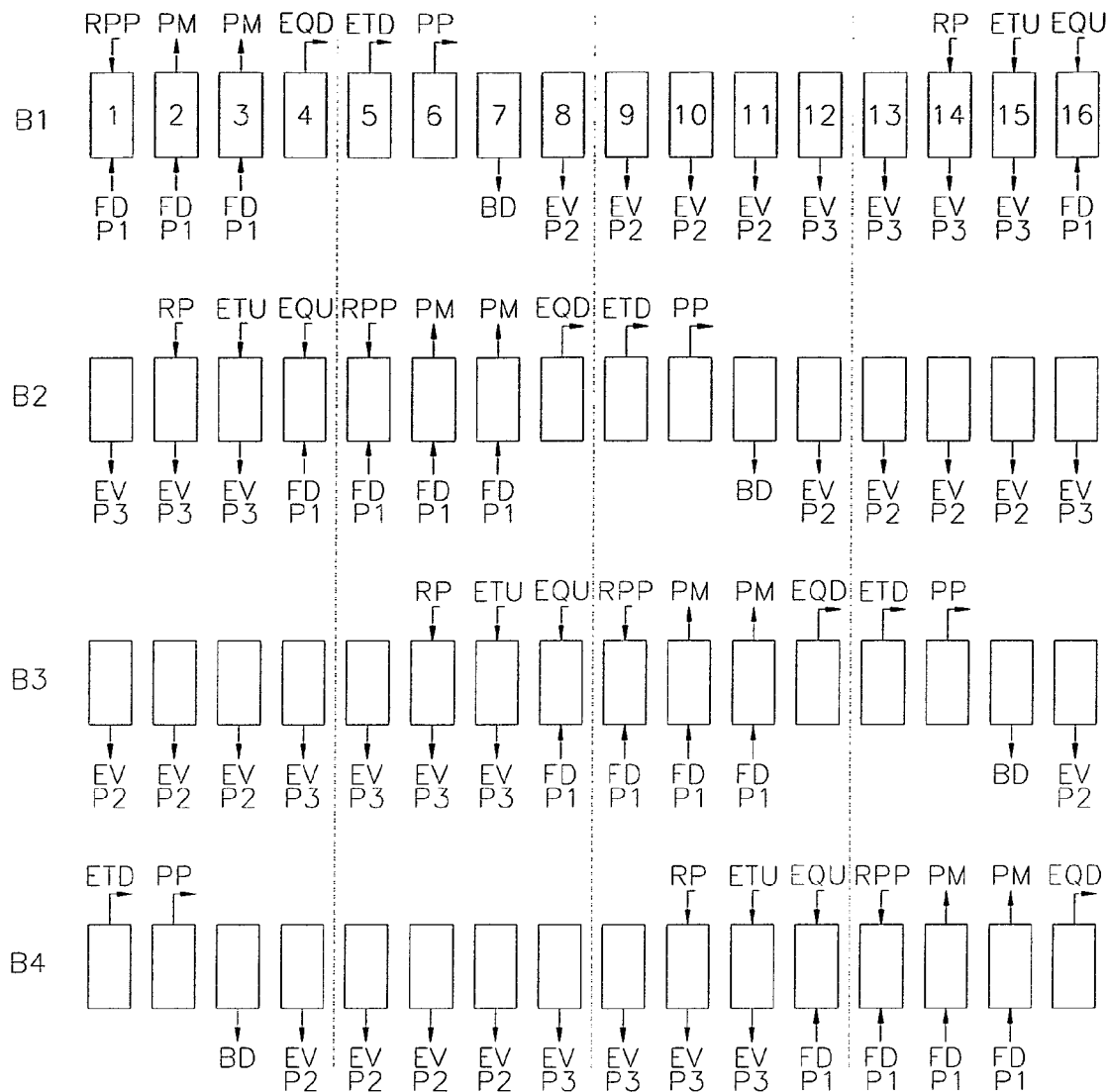
FIG. 5 is a schematic illustrating an alternate four-bed VPSA column cycle for use in the process of FIG. 1, wherein there is actual bed-to-bed communication (EQDN with EQUP overlap with FP).
Figure 6:
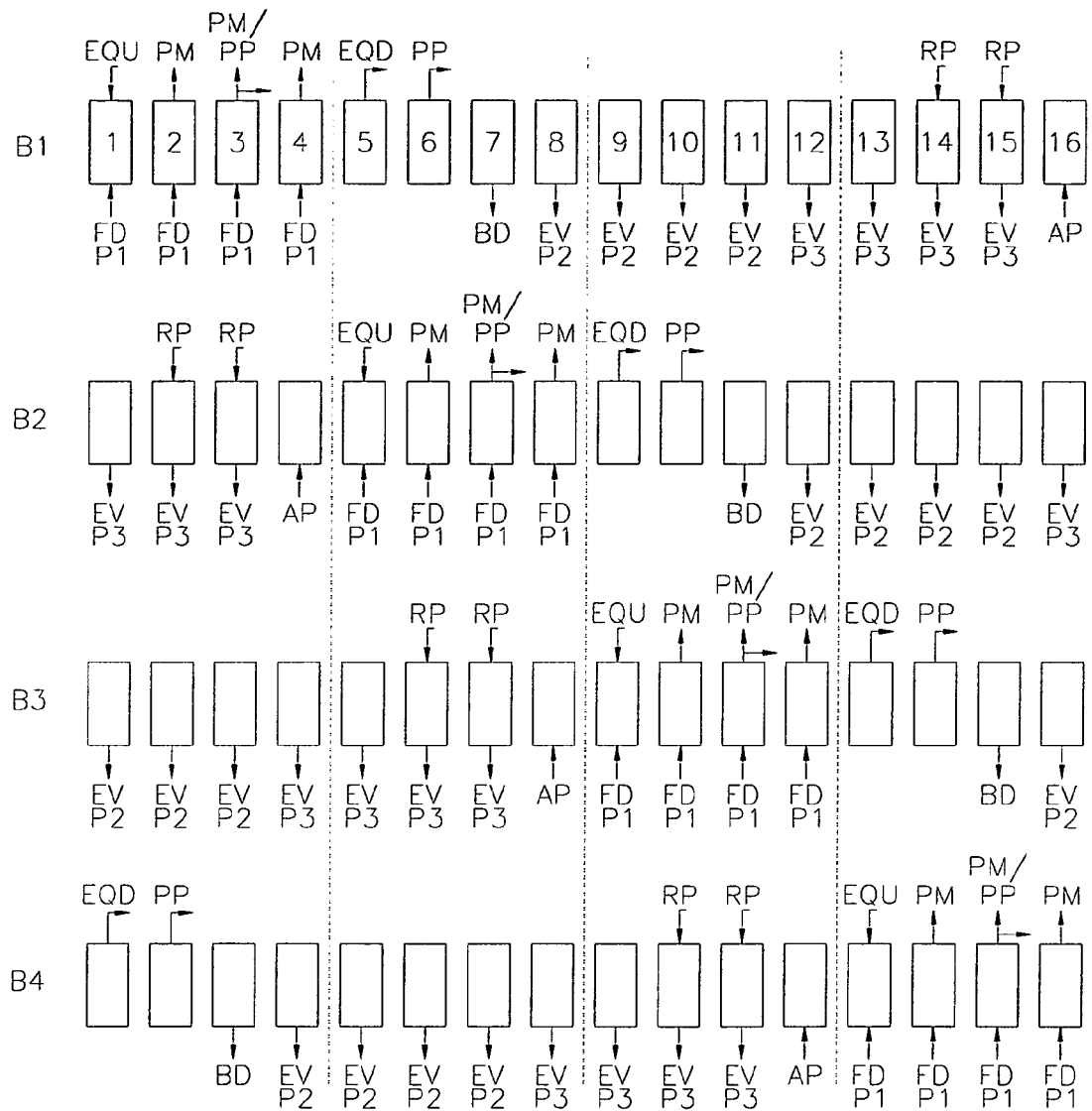
FIG. 6 is a schematic illustrating an alternate four-bed VPSA cycle for use in the process of FIG. 1, wherein there is no ET in the VPSA process.

Example operating conditions and performance projections (FIGS. 2-4 VPSA Cycle for greater than 175 TPD oxygen production).

| | |
|---|---|
| Adsorbent in Lower Bed: | Li—X |
| Feed Composition ($N_2/O_2$/Ar): | 78.12%/20.95%/0.934% |
| High Pressure: | 160 kPa |
| Low Pressure: | 30 kPa |
| Total Feed: | $1.43 \times 10^6$ NCFH |
| Amount of $O_2$ Produced: | $1.98 \times 10^5$ NCFH (196 TPD $O_2$) |
| Oxygen Purity: | 90% |
| Overall Oxygen Recovery: | 66% |
| Bed Size Factor: | 483 lb/TPD $O_2$ |
| Temperature | 300 K |

Each of the four-beds contains Li—X zeolite for $N_2$ removal. The results shown in Table 2 were obtained from a PSA simulation using dry air containing 0.934% Ar, 78.12% $N_2$ and 20.95% $O_2$.

In alternative modes of operation, other processes and cycles could be used, e.g., FIGS. 3-6 show alternate column cycle diagrams for the dual vacuum pump four-bed VPSA process of FIG. 1. In the preferred mode shown in FIG. 2, steps 1, 5, 9, and 13 utilize product gas to pressurize the beds in addition to feed gas. In the alternative mode shown in FIG. 3, no product gas is used to pressurize the bed. In the preferred mode shown in FIG. 2, the online bed in steps 3, 7, 11, and 15 provides purge gas to the top of the bed undergoing evacuation. In the alternative mode shown in FIG. 4, the online bed does not provide purge gas. Instead purge gas is provided from the ET. Then in steps 4, 8, 10, and 16 the remaining gas in the ET is used for equalization gas. In the preferred mode shown in FIG. 2, during steps 4, 8, 12, 16 the online bed continues product production. In the alternative mode shown in FIG. 5, product production stops at the start of steps 4, 8, 12, 16 and instead, the bed provides equalization gas to the top of the bed that is also receiving feed gas at the bottom, e.g., during step 4, Bed 1 provides gas to the top of Bed 2 while Bed 2 is receiving feed gas from Compressor 1. In the alternative mode shown in FIG. 6, there is no ET and equalization occurs from bed to bed. In this mode there is no product pressurization. In this mode there is an air pressurization step during steps 4, 8, 12, and 16, in which air enters the bottom of a bed that is under vacuum to raise the pressure of the bed to ambient pressure. The air could enter the beds thru Valve 5 for Bed 1, Valve 6 for Bed 2, Valve 7 for Bed 3, and Valve 8 for Bed 4 (referring to FIG. 1).

Although the above VPSA process is focused on $O_2$ production from air using a four-bed process, three or more than four beds could be used as well. Also, each bed could consist of one or several layers of adsorbents, or mixture of adsorbents. The adsorber configuration selected (e.g., radial, axial, structured, etc.) and choice and arrangement of the adsorbents will be determined based on size of the feed flow, the type of feed source, and PSA process operating conditions. Details of suitable adsorbents and layering of the adsorbents are given by Ackley et al. in U.S. Pat. No. 6,027,548.

In the application of the various embodiments of the invention, the highest adsorption pressure is in the range of 100 kPa to about 2000 kPa, and the lowest desorption pressure is in the range of 20 kPa to about 100 kPa. The average purity of the oxygen product is in the range of 85% oxygen to about 95% oxygen.

In any of the embodiments, a prepurifier section (e.g., a layer of alumina) can be placed at the upstream end of the zeolite bed to remove water and carbon dioxide from the feed air.

In other modes of operation, other adsorbents could be used in the aforementioned PSA processes of this invention. For example, 5A, 13X, and mixed cations zeolites could be used as the $N_2$ selective adsorbent in the VPSA process In general, an equalization tank is empty and does not contain any materials. In the present invention, the equalization tank can be empty or packed with inert or adsorbent materials. In the case when the equalization tank contains inert or adsorbent materials, both a fully or partially packed equalization tank can be used. Furthermore, the packing material for the equalization tank could be beads or pellets or structured supports such as monoliths, stainless steel wire mesh and alumina foams. Alternatively, the equalization tank can contain baffles instead of inert or adsorbent materials.

Finally, feeds other than air feed (e.g., $H_2$ containing feed mixture from synthesis gas generated from steam methane reforming) could also be used, and the process could be adapted quite easily for desired product or co-products production. For example, co-production of $O_2$ and $N_2$ or $H_2$ and CO could be achieved easily from air feed and $H_2$ containing feed, respectively.

Some of the benefits of the process and system of the present invention include enhanced $O_2$ recovery and less PSA waste for the vacuum pump to handle; less spreading of the impurity (e.g., $N_2$) concentration fronts; continuous feed and evacuation steps in the cycle to achieve 100% utilization of compressor and two vacuum pumps; application of increasing purity gas for purging resulting in better regeneration of the beds; incorporation of a counter-current blow down step in the VPSA cycle to allow a portion of the waste (obtained during bed regeneration) to bypass the vacuum pump (see e.g., U.S. Pat. Nos. 5,656,068 and 6,010,555, wherein all of the waste goes through the vacuum pump); cleaner gas used for refluxing that results in sharper $O_2$ concentration or better bed regeneration prior to bringing the bed online for $O_2$ production (see e.g., U.S. Pat. Nos. 5,656,068, 5,997,612 and 6,010,555, wherein excessive spreading of the impurity concentration fronts are unavoidable, resulting in a more aggressive regeneration, i.e., larger quantity of refluxing gas (e.g., for purging, product re-pressurization, etc.)); higher pressure gradient driving force for void gas recovery versus the prior art (see e.g., U.S. Pat. No. 6,010,555 or 5,656,068); less feed blow-by during feed pressurization because of the higher intermediate pressure in the bed prior to the introduction of the feed gas in the VPSA cycle (see e.g., U.S. Pat. Nos. 5,656,068 and 6,010,555, wherein the gas recovered at the start of the co-current depressurization step is sent to another bed that is still in the purging step, followed by co-current depressurization and feed end equalization, resulting in a smaller driving force for mass transfer when this bed communicates with the other bed undergoing equalization rising and feed pressurization steps simultaneously; furthermore, a product quality gas is used for purging followed by the use of void space gas containing higher impurity concentration that contaminates the product end of the bed).

Yet another benefit of the present invention is that it uses two different purity purge gases. The high purity purge gas goes directly to another bed undergoing the purging step without the use of any storage tank, and the low purity gas comes from a co-current depressurization step following the bed-to-tank equalization step. This low purity gas also goes directly to another bed that has just completed the last counter-current evacuation step in the VPSA cycle. The steps in the VPSA cycle are arranged in such a manner that low quality purge gas is used for the initial purging of the beds followed by the use of high purity purge gas for the final purging of the beds. Such mode of operation allows for the use of low purity purge gas for purging another bed while at the same time minimizing the quantity high purity gas. Also, this purging gas goes directly to another bed undergoing the purging step without the use of a storage tank (see e.g., U.S. Pat. No. 5,997,612).

Additionally, the present invention includes an option to use same or different vacuum pumps (e.g., centrifugal and roots or positive displacement) for evacuating the beds and 100% utilization, i.e., no compressor vacuum pump unloading throughout the PSA cycle.

The present invention is also expected to provide about 10-20% improvement in $O_2$ productivity/recovery and 5-10% reduction in capital cost because it utilizes a single feed compressor and two vacuum pumps efficiently (100% utilization), has smaller beds and/or less adsorbent per unit of oxygen produced (lower bed size factor), and avoids the use of product quality gas for purging.

Although the invention has been described in detail with reference to certain preferred embodiments, those skilled in the art will recognize that these are other embodiments within the spirit and the scope of the claims.

What is claimed is:

1. A vacuum pressure swing adsorption (VPSA) process for separating a feed supply gas containing at least one more strongly adsorbable component and at least one less strongly adsorbable product gas component, the process comprising: (a) using a system comprising three or more adsorber beds, (b) continuously feeding a feed supply gas into a feed input end of one adsorber bed, said bed containing at least one adsorbent which preferentially adsorbs the more strongly adsorbable component and withdrawing the at least one less strongly adsorbable product gas component from an exit end of the adsorber bed, (c) providing continuous feeding of the feed supply gas using a single feed blower, (d) purging the adsorber beds using two purge gases of different purity, and (e) producing the product gas component in cycles by steps wherein at any instant during the process, two beds are in an evacuation step and only one bed is in a feed mode.

2. The VPSA process of claim 1, wherein the process further comprises using an equalization tank (ET) to collect co-current depressurization gas.

3. The VPSA process of claim 2, wherein the VPSA process comprises four adsorber beds in a single train.

4. The VPSA process of claim 3, wherein the cycles by steps comprise a sixteen-step cycle.

5. The VPSA process of claim 4, wherein the VPSA process comprises partially pressurizing the adsorber beds using the co-current depressurization gas collected in the equalization tank via bed-to-tank equalization.

6. The VPSA process of claim 5, wherein the first purge gas is a purge gas that goes directly from one adsorber bed to another adsorber bed and the second purge gas is generated from another adsorber bed undergoing a co-current depressurization step following the bed-to-tank depressurization step.

7. The VPSA process of claim 6, wherein the VPSA process comprises a first purge step using the first purge gas followed by a second purge step using the second purge gas.

8. The VPSA process of claim 7, wherein the VPSA process comprises a separate counter-current blowdown step such that any waste generated during said blowdown step bypasses the vacuum pump.

9. The VPSA process of claim 8, wherein the VPSA process comprises intermediate pressurization steps.

10. The VPSA process of claim 9, wherein the intermediate pressurization steps comprise a bed-to-tank equalization step and an overlap feed and product pressurization step.

11. The VPSA process of claim 1, wherein the process comprises bed-to-bed equalization and a pressurization step in which the feed supply gas is provided at the bottom of an adsorber bed.

12. The VPSA process of claim 1, wherein the highest adsorption pressure is in the range of about 100 kPa to about 2000 kPa and the lowest adsorption pressure is in the range of about 20 kPa to about 100 kPa.

13. A vacuum pressure swing adsorption (VPSA) system for separating a feed supply gas containing at least one more strongly adsorbable component and at least one less strongly adsorbable product gas component, wherein the system comprises:
a single feed supply line;
three or more adsorber beds operated in series in a single train;
an equalization tank (ET) to collect void gas that is co-currently discharged from the adsorber beds;
at least one vacuum pump to evacuate two adsorber beds simultaneously; and
a feed compressor.

14. The VPSA system of claim 13, wherein the at least one vacuum pump comprises two vacuum pumps.

15. The VPSA system of claim 14, wherein one vacuum pump is a centrifugal vacuum pump and one vacuum pump is a Roots-type vacuum pump.

16. The VPSA system of claim 13, wherein the equalization tank is packed with inert or adsorbent materials.

17. The VPSA system of claim 16, wherein the inert or adsorbent materials are in the form of bead, pellets or structured supports.

18. The VPSA system of claim 17, wherein the structured supports are monoliths, stainless steel wire mesh or alumina foams.

19. The VPSA system of claim 13, wherein the equalization tank contains baffles.

20. The VPSA system of claim 13, wherein each adsorbent bed comprises a prepurifier section located at the upstream end of the adsorbent bed.

21. The VPSA system of claim 20, wherein the prepurifier section comprises a layer of alumina.

22. The VPSA system of claim 13, wherein the at least one vacuum pump and the feed compressor can be utilized 100% of the time of operation of the system.

23. The VPSA system of claim 13, wherein the system is configured to produce at least 175 tons per day of oxygen.

24. The VPSA system of claim 13, wherein each adsorber bed contains an $N_2$ selective adsorbent.

25. The VPSA system of claim 13, wherein the adsorbent comprises at least one of: Li—X zeolite, 5A, 13X, CaX, and mixed cations zeolites.

26. The VPSA system of claim 13, wherein the system comprises four adsorber beds in a single train.

27. A vacuum pressure swing adsorption (VPSA) process for separating a feed supply gas containing at least one more strongly adsorbable component and at least one less strongly adsorbable product gas component, the process comprising: (a) using a system comprising four adsorption beds, (b) continuously feeding a feed supply gas into a feed input end of at least one adsorption bed, said bed containing at least one adsorbent which preferentially adsorbs the more strongly adsorbable component and withdrawing the at least one less strongly adsorbable product gas component from an exit end of the adsorption bed, (c) providing continuous feeding of the feed supply gas using a single feed blower, (d) purging the adsorption beds using a first purge gas having the lower concentration of the less strongly adsorbable product gas component followed by a second purge gas having a higher concentration of the less strongly adsorbable product gas component then the first purge gas, and (e) producing the product gas component.

28. The VPSA process of claim 27 wherein the first purge gas is a co-current depressurization gas and the second purge gas is product gas.

29. The VPSA process of claim 28 wherein the first purge gas also goes directly to another adsorption bed that has just completed the last counter-current evacuation step in the cycle.

30. The VPSA process of claim 27 wherein only one compressor and two vacuum pumps are employed.

31. The VPSA process of claim 27 wherein one vacuum pump evacuates two adsorption beds simultaneously.

* * * * *